United States Patent [19]

Nishizawa et al.

[11] Patent Number: 4,698,568
[45] Date of Patent: Oct. 6, 1987

[54] ANTIEXPLOSION STRUCTURE IN A WORKING ROBOT

[75] Inventors: Shun-ichi Nishizawa; Toshio Tsubota; Takashi Chikura, all of Nagoya, Japan

[73] Assignee: Mitsubishi Jukogyo Kabushiki Kaisha, Tokyo, Japan

[21] Appl. No.: 842,845

[22] Filed: Mar. 24, 1986

[30] Foreign Application Priority Data

Mar. 29, 1985 [JP] Japan .................................. 60-63731

[51] Int. Cl.⁴ .......................... H02H 7/08; B25J 19/06
[52] U.S. Cl. ........................................ 318/481; 901/49
[58] Field of Search ..................... 318/481; 310/88, 85; 361/23; 174/52 R, 52 S, 58, 59; 901/1, 49, 50

[56] References Cited

U.S. PATENT DOCUMENTS 3,289,485 12/1966 Cazalis et al. ..................... 901/49 X
3,335,323 8/1967 Molin .............................. 318/481 X

FOREIGN PATENT DOCUMENTS 3113000 10/1982 Fed. Rep. of Germany .... 174/52 S
57-9237  1/1982 Japan ..................................... 310/88
58-66550 4/1983 Japan ..................................... 310/88
1210898 11/1970 United Kingdom .................. 901/49

Primary Examiner—William M. Shoop, Jr.
Assistant Examiner—Bentsu Ro
Attorney, Agent, or Firm—Wenderoth, Lind & Ponack

[57] ABSTRACT

An antiexplosion structure in an electric motor drive type working robot includes a sealing structure for sealingly enclosing electric motors for driving the robot and wirings for the motors. Dry air is continuously fed into the sealing structure at a pressure higher than the environmental atmosphere. A pressure detector detects the pressure of the dry air within the sealing structure to permit electric current feed to the electric motors only when the detected pressure has a normal value.

4 Claims, 9 Drawing Figures

ANTIEXPLOSION STRUCTURE IN A WORKING ROBOT

BACKGROUND OF THE INVENTION

1. Field of the Invention

The present invention relates to an antiexplosion structure in an electric motor drive working robot.

2. Description of the Prior Art

Heretofore, in the case of a robot to be used for work which necessitates an antiexplosion facility such as, for example, a painting robot, it has been common practice to construct the robot to be of the hydraulic drive type. However, such hydraulic drive type robot has the shortcomings that maintenance and handling of the robot are complex and its cost is also high.

On the other hand, in the case of an electric motor drive type robot, while maintenance and handling are easy, in order to provide this type of robot with an antiexplosion facility it was necessary to contemplate reductions in size and cost.

SUMMARY OF THE INVENTION

It is therefore one object of the present invention to provide a compact and less expensive antiexplosion structure in an electric motor drive type working robot.

According to one feature of the present invention, there is provided an improved antiexplosion structure in a working robot which comprises a sealing structure for sealingly enclosing electric motors for driving the working robot and wirings therefor, air feed means for continuously feeding dry air into the sealing structure at a pressure higher than the environmental atmosphere, and pressure detector means for detecting the pressure of the dry air within the sealing structure to permit electric current feed to the electric motors only when the detected pressure has a normal value.

In the electric motor drive type working robot provided with the antiexplosion structure according to the present invention, since a less expensive small-sized electric motor can be used for driving the robot, the robot itself becomes compact and less expensive. In addition, with the antiexplosion structure according to the present invention, since electric motors and wirings therefor are shielded from external combustible gases and also they are being cooled by dry air flowing therearound, even if any accident should occur and heat should be generated in these components, safety can be maintained. Furthermore, according to the present invention, provision is made that in the event that any anomaly should arise in a circuit of dry air for shielding the electric motors and the wirings from the external atmosphere, electric current feed is interrupted by action of a pressure detector, and safety of the robot is extremely high.

The above-mentioned and other objects, features and advantages of the invention will become more apparent by reference to the following description of preferred embodiments of the invention taken in conjunction with the accompanying drawings.

DESCRIPTION OF THE PREFERRED EMBODIMENTS

Now, description will be made of one preferred embodiment of the present invention with reference to FIGS. 1 to 7.

Figure 1:
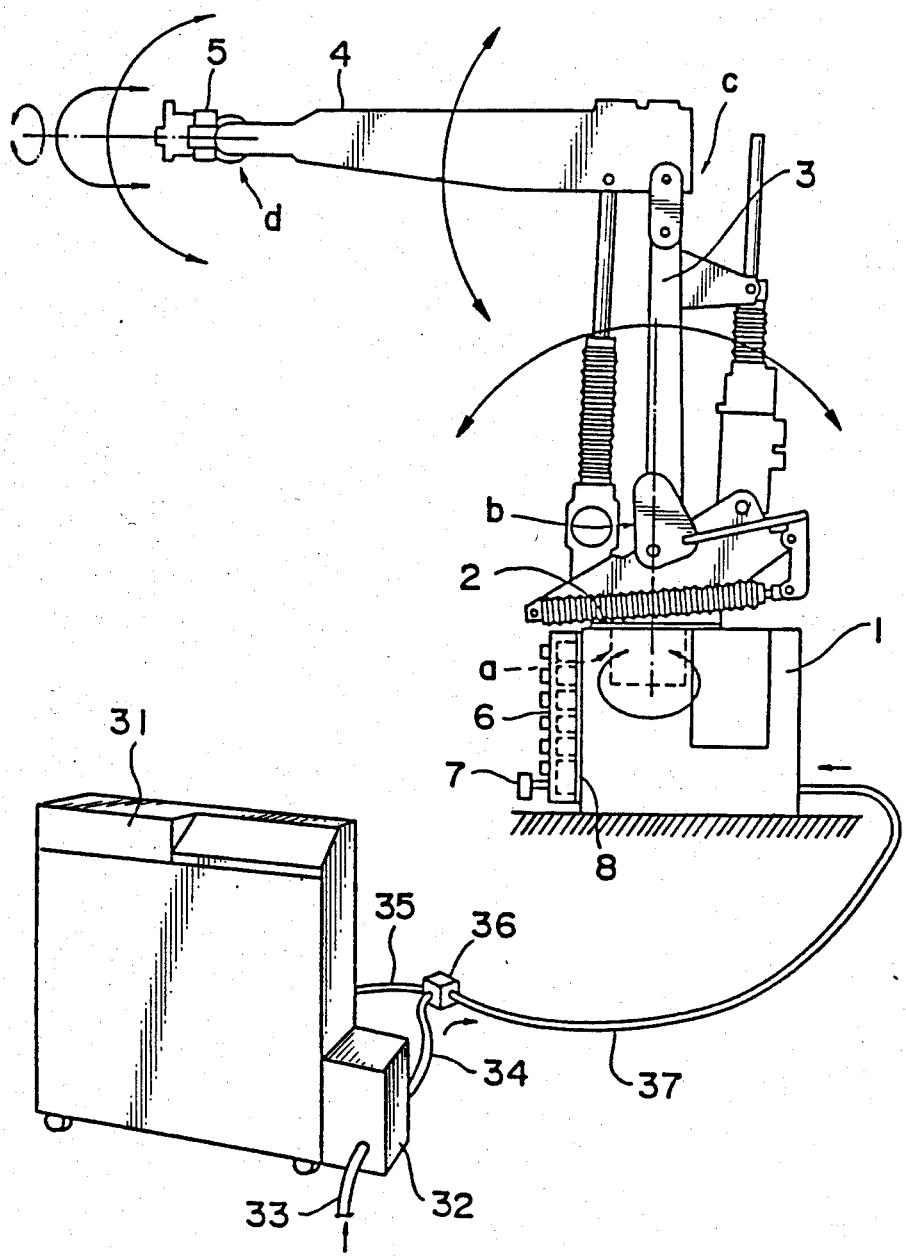
FIG. 1 is a schematic side view partly in perspective of an electric motor drive type working robot provided with an antiexplosion structure according to one preferred embodiment of the present invention.

A main body of a working robot according to this preferred embodiment is constructed as shown in FIG. 1, in which a turn table 2 is disposed on a terminal box 1 via a first articulation a so that the turn table 2 can be arbitrarily rotated, a vertical arm 3 is connected to the top of the turn table 2 via a second articulation b so that the vertical arm 3 can be rocked back and forth relative to a vertical line, a horizontal arm 4 is connected to the tip end of the vertical arm 3 via a third articulation c so that the horizontal arm 4 can be arbitrarily swung up and down relative to a horizontal line, and a wrist 5 is connected to the tip end of the horizontal arm 4 via a fourth articulation d so that the wrist 5 can be swung about the articulation d. In addition, the wrist 5 itself is constructed to be rotatable about its own axis.

Figure 2:
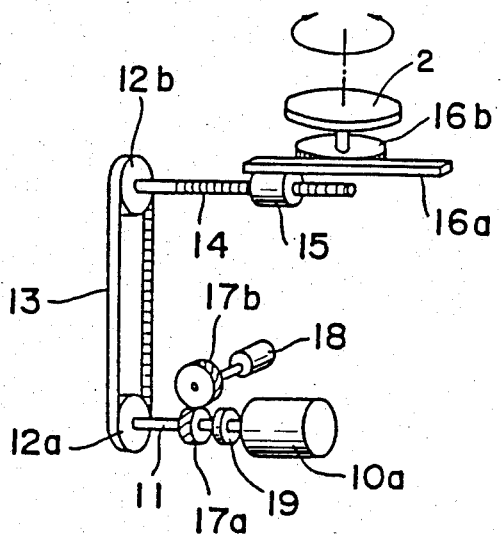
FIGS. 2 to 5 are schematic operation drive system diagrams showing various examples of drive mechanisms for different articulations in a robot main body.

At the first articulation a, there is provided a drive mechanism as shown in FIG. 2. In this drive mechanism, a driving torque of a motor 10a is transmitted to a pulley 12a via a clutch 19 and a shaft 11, and the rotation of the pulley 12a is transmitted to a ball screw 14 through a timing belt 13 and a pulley 12b. Around this ball screw 14 is threadedly fitted a ball nut 15 which is fixedly secured to a rack 16a, hence the rack 16a may reciprocate jointly with the ball nut 15, resulting in rotation of a pinion 16b, and in conjunction with this pinion 16b the turn table 2 is made to turn. In addition, rotation of the shaft 11 is transmitted to a potentiometer 18 via spiral gears 17a and 17b.

Figure 3:
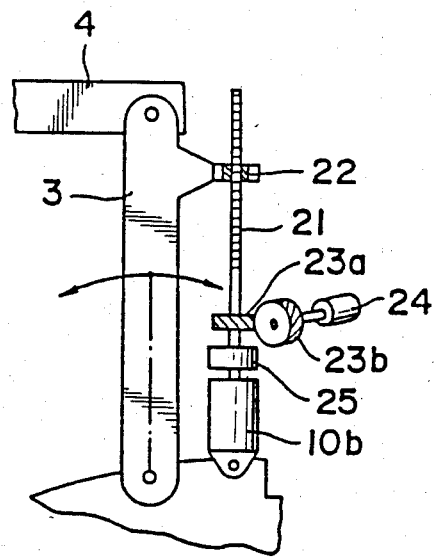

At the second articulation b, there is provided a drive mechanism as shown in FIG. 3. This drive mechanism is constructed in such manner that a ball screw 21 is rotated by a motor 10b by the intermediary of a clutch 25, a ball nut 22 supported from the vertical arm 3 is threadedly fitted around this ball screw 21, and hence the ball nut 22 is reciprocated as a result of rotation of the ball screw 21. Since arm 3 and motor 10b are pivotally on turn table 2, the vertical arm 3 is actuated to rock relative to the turn table 2 by relative axial movement of nut 22 along screw 21. In addition, the rotation of the ball screw 21 is transmitted to a potentiometer 24 via spiral gears 23a and 23b.

Figure 4:
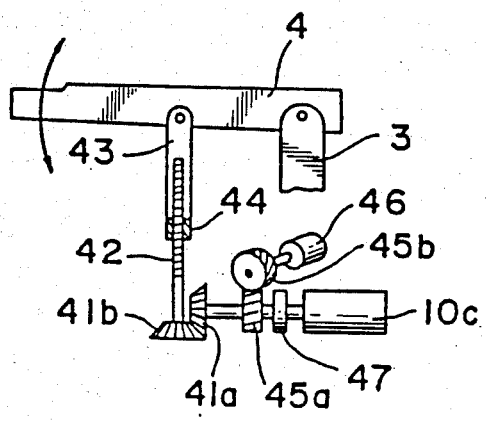

Also at the third articulation c, there is provided a drive mechanism as shown in FIG. 4. This drive mechanism is constructed in such manner that rotation of a motor 10c is transmitted to a ball screw 42 via a clutch 47 and bevel gears 41a and 41b. As a result of rotation of the ball screw 42 a ball nut 44 fixedly secured to a bottom end of a link 43 is reciprocated along screw 42. The other end of the link 43 being pivotably mounted to the horizontal arm 4, and thereby the horizontal arm 4 is actuated to swing up and down relative to a horizontal line. In addition, the rotation of the ball screw 42 is transmitted to a potentiometer 46 via spiral gears 45a and 45b.

Figure 5:
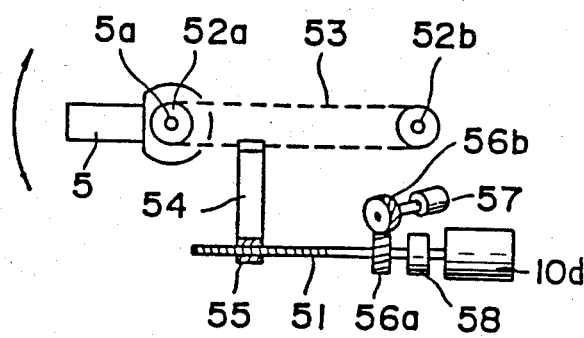

Furthermore, at the fourth articulation d, there is provided a drive mechanism as shown in FIG. 5. In this drive mechanism, a ball screw 51 is rotated via a clutch 58 by means of a motor 10d, a chain 53 extended around a pair of sprockets 52a and 52b is stretched in parallel to the ball screw 51, a bracket 54 is projected from the chain 53, and at the tip end of the bracket 54 is supported a ball nut 55 that is threadedly fitted around the ball screw 51. One sprocket 52a is fixedly secured to a pivotal shaft 5a of the wrist 5. The rotation of the ball screw 51 is transmitted to a potentiometer 57 via spiral gears 56a and 56b. With this drive mechanism, when the ball screw 51 is rotated by the motor 50 to reciprocate the ball nut 55, the chain 53 is driven by the intermediary of the bracket 54, and at that time the wrist 5 is made to swing up and down by the rotation of the sprocket 52a.

It is to be noted that while the wrist 5 in the robot of the illustrated embodiment also can achieve swinging motion in a horizontal plane as well as revolution about its own axis, illustration and explanation of the corresponding drive mechanisms will be omitted because similar drive mechanisms to those described above could be employed.

As described above, upon practicing the present invention, conventional small-sized electric motors can be used for driving the main body of the working robot.

Figure 6:
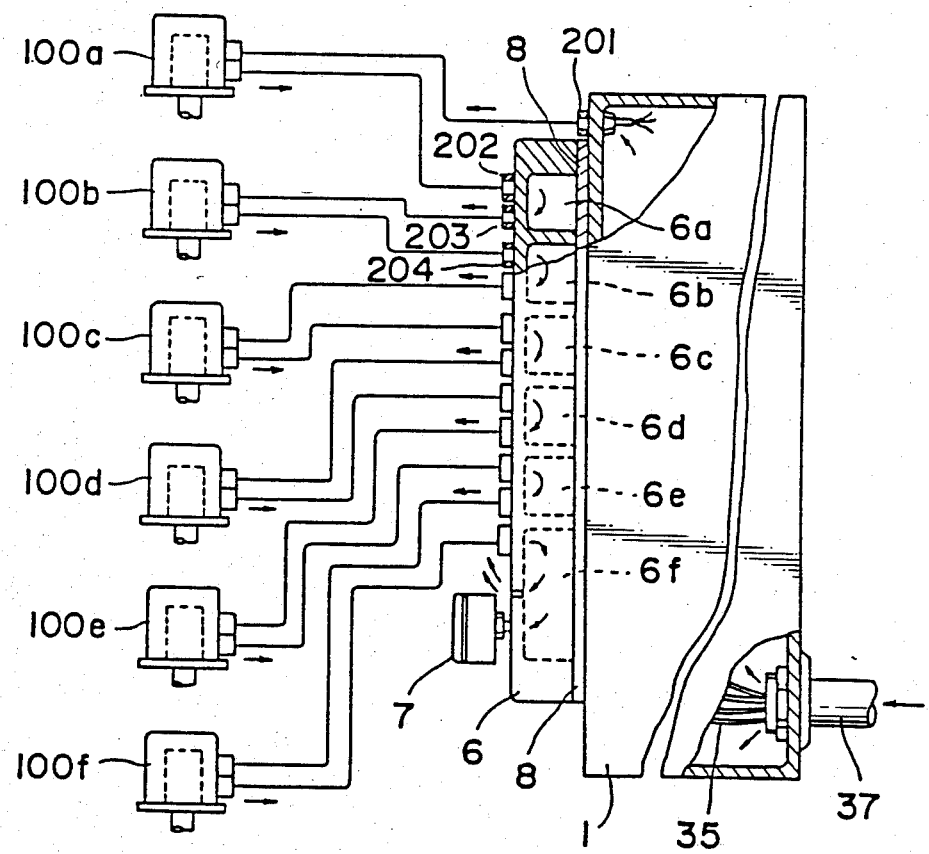
FIG. 6 is an air circuit diagram of a dry air circuit in an antiexplosion structure according to one preferred embodiment of the present invention.
Figure 7A:
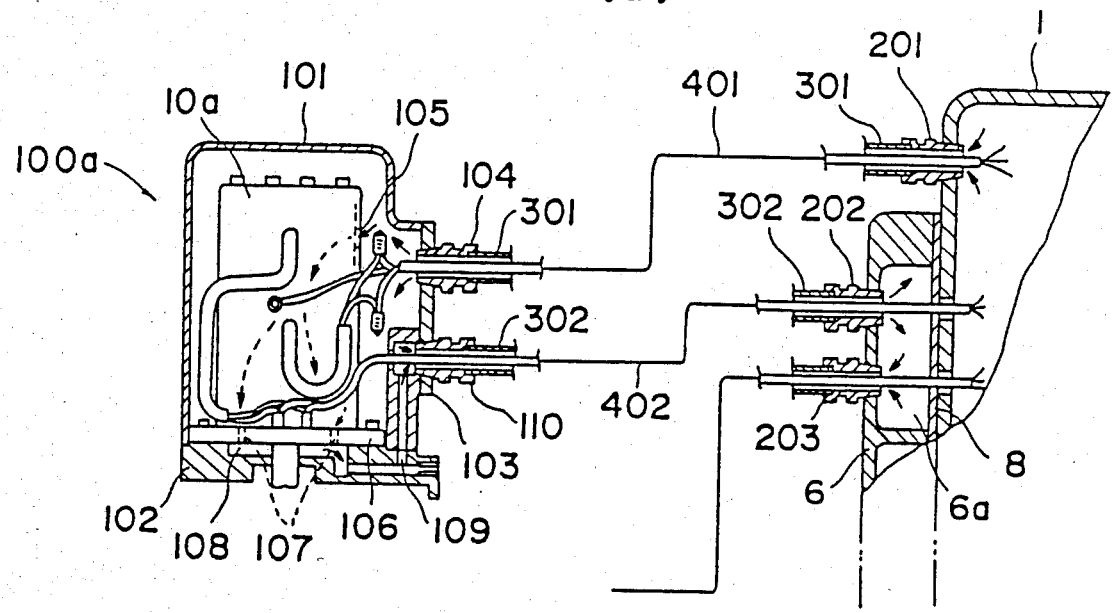
FIGS. 7(a) and 7(b) are partial cross-sectional views showing a part of the dry air circuit in greater detail.
Figure 7B:
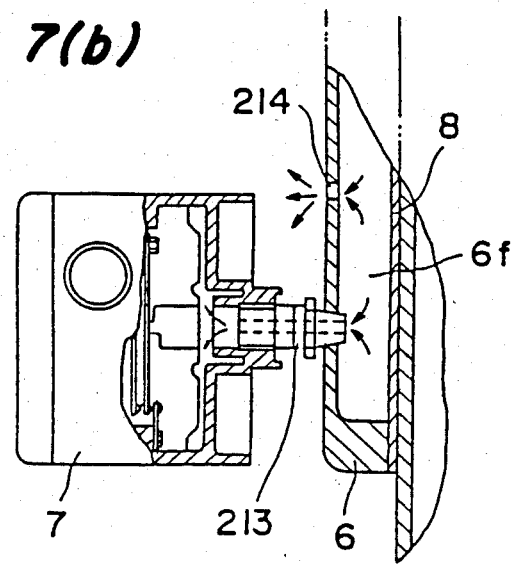

Now, an antiexplosion structure in a working robot according to one preferred embodiment of the present invention will be described with reference to FIGS. 6, 7(a) and 7(b). In these figures, arrows indicate flows of dry air.

As shown in these figures, six electric motors 10a to 10f for driving the above-described main body of the working robot are constructed in the form of air-tightly sealed motor units 100a to 100f, respectively. These motor units 100a to 100f have such structures that clean dry air can be fed into the units at a pressure higher than an environmental atmosphere, and thereby the electric motors 10a to 10f can be shielded from an external dangerous atomosphere.

Now, details of these motor units 100a to 100f will be explained, by way of example, with respect to the motor unit 100a that has been chosen as representative. In this motor unit 100a, an electric motor 10a is air-tightly sealed by a motor housing 101 and covers 102 and 103. To the above-mentioned cover 103 are mounted connectors 104 and 110 which serve as an inlet and an outlet, respectively, of wirings and dry air. To these connectors 104 and 110 are air-tightly connected tubes 301 and 302 which serve as passageways of dry air and also which are available as cover hoses for wirings.

Here, description will be made in greater detail with respect to means for air-tightly sealing the wirings for controllably driving the drive electric motors 10a to 10f and means for feeding dry air into the sealing means.

As shown in FIG. 1, a robot control panel 31 for controlling the electric motors 10a to 10f, and an air feeder 32 for feeding dry air into the motor units 100a to 100f, are installed externally of a dangerous atomosphere. To this air feeder 32 is connected an air hose 33 that is led from an air feed source not shown through a filter, a water drop remover, and a circuit including a pressure gauge and a safety valve also not shown, and clean dry air delivered from this air feeder 32 is led to a repeater 36 through an air hose 34. In this repeater 36, the air hose 34 and an electric cable 35 wired to the robot control panel 31 are assembled together. Then, the dry air is led into the terminal box 1 having a sealed structure, jointly with electric cable 35 through a tube 37 which also serves as a cover hose for the electric cable 35, and further the dry air is led successively through air reservoirs 6a to 6f within a terminal box cover 6 which is mounted to the terminal box 1 via a rubber packing 8, to the above-described motor units 100a to 100f.

At first, the clean dry air introduced into the terminal box 1 comes out of a connector 201, passes through tube 301 which also serves as a cover hose for a wiring, and is led into the motor unit 100a through the connector 104 mounted to the motor housing 101. Subsequently, the dry air enters the interior of the motor through ventilating holes 105 formed in the electric motor 10a, and after it has uniformly passed through the interior of the motor, it flows into an air reservoir 108 provided in the cover 102 through multiple holes 107 formed in a ventilating plate 106 of the electric motor 10a. Furthermore, this dry air passes through a ventilating hole 109 formed by the motor housing 101 and the covers 102 and 103, and reaches an air reservoir 6a within the terminal box cover 6 through the connector 110 and tube 302 which also serves as a cover hose for a wiring, see FIG. 7(a). Thereafter, the dry air flows in a similar manner from the air reservoir 6a through the route consisting of 6a→100b→6b→100c→6c→100d→6d→100e→6e→100f→6f, see FIG. 6. The dry air which has reached the air reservoir 6f in the above-described manner, is partly led into a pressure detector 7, and the remainder is exhausted externally of the main body of the working robot through a hole 214 formed in the terminal box cover 6, see FIG. 7(b).

This pressure detector 7 is mounted to the terminal box cover 6 via a connector 213, and for instance, a diaphragm type pressure detector can be employed. In this pressure detector 7, the pressure of the dry air is continuously measured, and a circuit which permits current feed to the above-described electric motors 10a to 10f only when the measured pressure is normal, is assembled in the pressure detector 7.

On the other hand, the wirings for the electric motors 10a to 10f are effected as follows. At first, the electric cable 35 (FIG. 1) introduced into the terminal box 1 is wired to the respective electric motors 10a to 10f after they have been passed through a terminal panel not shown. A wire 401 (FIG. 7) forming a circuit for feeding electric power to the electric motor 10a is connected from the terminal panel through connector 201, tube 301 and the connector 104 to the electric motor 10a. Also a wire 402 extends from the electic motor 10a through the connector 110, tube 302 and a connector 202 to air reservoir 6a, and further it penetrates through the rubber packing 8 and the side wall of the terminal box 1 and is connected to the terminal panel within the terminal box 1. In addition, an electric circuit for the electric motor 10b is formed through the route consisting of the terminal panel → air reservoir 6a → connector 203 → electric motor 10b → connector 204 → air reservoir 6b → the terminal panel (FIG. 6). The remainder of the electric motors 10c to 10f are also wired in a similar manner, hence all the wirings are held within a sealed structure with the above-described dry air flowing around the respective wirings to form an antiexplosion structure for shielding the electric motors and the wirings from the external atmosphere.

In such an antiexplosion structure, even if a spark should be generated from the terminal box 1 or the electric motors 10a to 10f, there would be no risk of explosion because they are shielded from the external combustible gases. In addition, in the event that any accident should arise in the electric motors 10a to 10f or on the wirings and heat should be generated thereby, since the electric motors and the wirings are cooled by the clean dry air flowing around them, there would be no risk that the external combustible gases may fire. Furthermore, since the electric motors 10a to 10f and the wirings therefor are all covered by the clean dry air, they would not be influenced by adhesion of dust or by moisture. Hence, the possibility of faults would be decreased, and therefore the proposed structure is also advantageous with regard to maintenance.

In addition, in the above-described antiexplosion structure, even if leakage of air should arise at the motor units 100a to 100f, the terminal box 1 and the cover 6 due to limited precision of machining, the entire system can be operated without disadvantage by merely increasing the feed rate of the dry air, and therefore, special structure to achieve air-tightness is not necessary. Accordingly, the proposed structure is also advantageous with regard to cost.

Furthermore, in the antiexplosion structure according to the above-described embodiment, since the motor units 100a to 100f and the air reservoirs 6a to 6f are connected in series, and since the wiring and the dry air are assembled in the same tube, a number of connecting parts for the terminal box 1 and the motor units 100a to 100f can be made small, and only one pressure detector can suffice. Also, wiring as well as piping become simple and the appearance of the structure also is improved.

Moreover, in the illustrated embodiment, since the pressure detector 7 is not disposed on the motor units 100a to 100f which are subjected to acceleration, but rather is mounted on terminal box cover 6 which is fixed on a floor surface, the control system will not malfunction.

Figure 8:
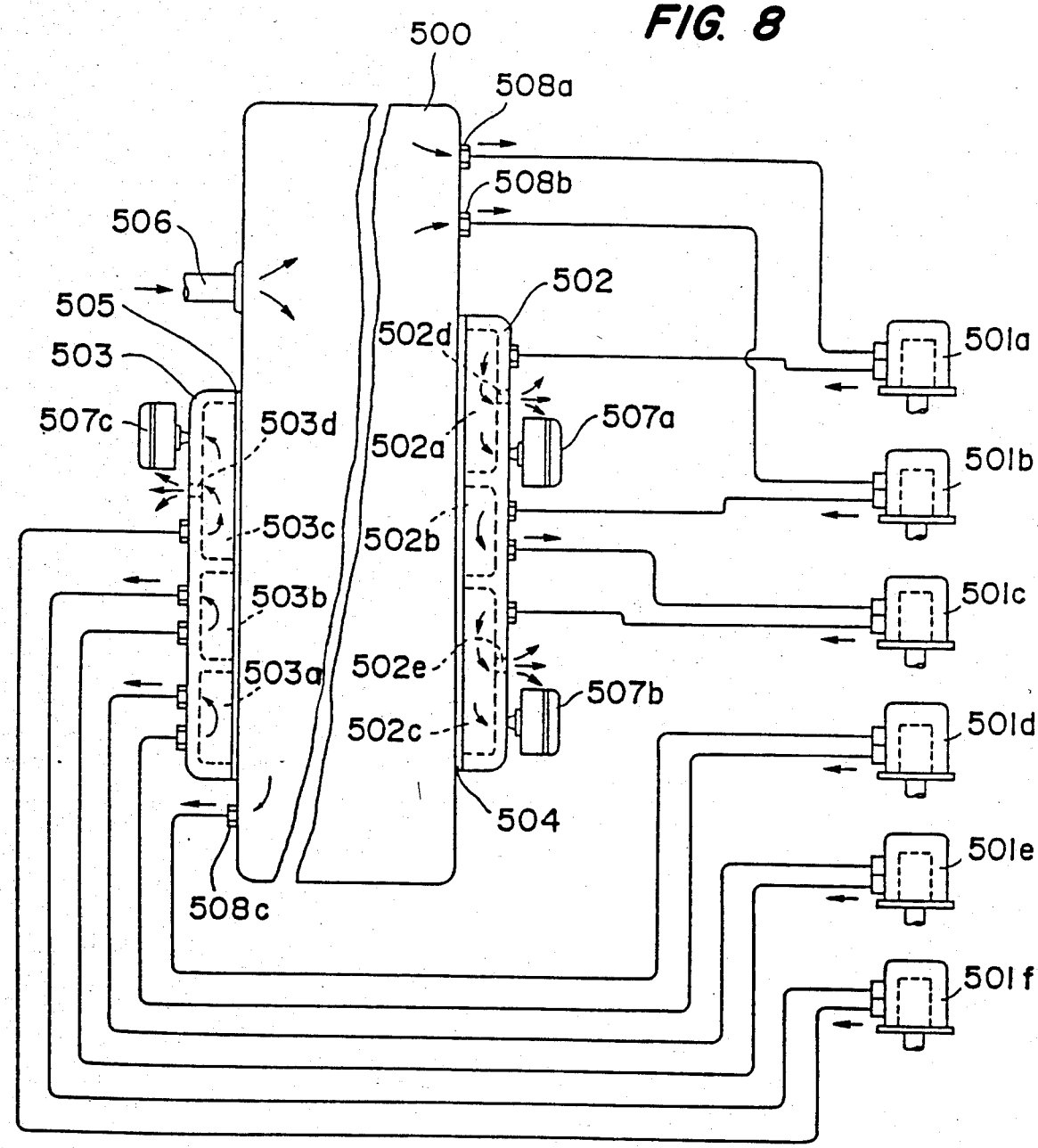
FIG. 8 is an air circuit diagram of a dry air circuit in an antiexplosion structure according to another preferred embodiment of the present invention.

FIG. 8 is a pneumatic circuit diagram showing flows of dry air through a terminal box 500, motor units 501a to 501f and pressure detectors 507a to 507c, in an antiexplosion structure according to another preferred embodiment of the present invention.

In the modified embodiment, to the terminal box 500 are mounted a terminal box cover 502 having air reservoirs 502a, 502b and 502c and a terminal box cover 503 having air reservoirs 503a, 503b and 503c, via rubber packings 504 and 505, respectively. And in this preferred embodiment, three pressure detectors 507a to 507c are employed, and three independent pneumatic circuits including the respective pressure detectors are formed, see FIG. 8.

The first circuit is a pneumatic circuit in which dry air introduced through a connector 506 flows through a route of connector 508a → motor unit 501a → air reservoir 502a. A part of the dry air reaching the air reservoir 502a is introduced into the pressure detector 507a, and the remainder is exhausted through a hole 502d. The second circuit is formed so as to pass through a route consisting of connector 508b → motor unit 501b → air reservoir 502b → motor unit 501c → air reservoir 502c, with a part of the dry air reaching the air reservoir 502c being introduced into the pressure detector 507b, and the remainder being exhausted through a hole 502e. The third circuit is formed so as to pass through a route consisting of connector 508c → motor unit 501d → air reservoir 503a → motor unit 501e → air reservoir 503b → motor unit 501f → air reservoir 503c, with a part of the dry air reaching the air reservoir 503c being introduced into the pressure detector 507c, and the remainder being exhausted through a hole 503d.

In the above-described modified construction, the following further advantages are obtained. That is, in this construction, by connecting the three pressure detectors 507a to 507c to a monitoring panel including indicator lamps and alarms which enable an attendant to detect the operation states of the respective pressure detectors 507a to 507c, the location of a fault such as air leakage can be easily known. Moreover, according to this modified embodiment, even in the extraordinary case where one of the pressure detectors operates erroneously and at the same time an anomaly arises in the pneumatic circuit also, the other normal pressure detectors can operate correctly and can stop electric current feed, and therefore, the control system is extremely safe.

It is to be noted that while clean dry air was made to flow through the antiexplosion structure in the above-described embodiments, as a matter of course, preliminarily cooled dry air could be employed.

As described in detail above in connection with preferred embodiments of the invention, in the electric motor drive type working robot provided with an antiexplosion structure according to the present invention, since a less expensive small-sized electric motor can be used for driving the robot, the robot itself becomes compact and less expensive. In addition, with the antiexplosion structure according to the present invention, since the electric motors and wirings therefor are shielded from external combustible gases and also they are being cooled by dry air flowing therearound, even if any accident should occur and heat is generated in these components, safety can be maintained. Furthermore, according to the present invention, since provision is made such that in the event that any anomaly should arise in the circuit of dry air for shielding the electric motors and the wirings from the external atmosphere, the electric current feed is interrupted by the action of a pressure detector, and the safety of the robot is extremely high.

Since many changes and modifications in design can be made to the above-described construction without departing from the spirit of the present invention, all matter contained in the above description and illustrated in the accompanying drawings shall be interpreted to be illustrative and not as a limitation to the scope of the invention.

What is claimed is:

1. In an electric motor drive type robot of the type intended for operation in an explosive atmosphere and including at least one electric drive motor and electric wiring for connecting said electric drive motor to an external power source, the improvement of antiexplosion means for preventing explosion of the explosive atmosphere by said electric drive motor and said electric wiring, said antiexplosion means comprising:

sealing means for hermetically enclosing said electric drive motor and said electric wiring from the explosive atmosphere;

air supply means for continuously supplying dry air from an external source into said sealing means and for continuously exhausting said dry air from said sealing means, and therefore for creating within said sealing means a continuous flow of said dry air maintained at a pressure above the pressure of the surrounding explosive atmosphere and flowing around and surrounding said electric drive motor and said electric wiring; and pressure detecting means for continuously detecting the pressure of said dry air within said sealing means and for, upon the thus detected pressure dropping below a predetermined value, immediately interrupting the supply of electric current to said electric drive motor.

2. The improvement claimed in claim 1, comprising a plurality of electric drive motors, each said electric drive motor having connected thereto respective wirings, and said sealing means comprises a plurality of sealed housings enclosing respective said electric drive motors and dry air circuit means sealingly surrounding said wirings for connecting the dry air external source to said sealed housings.

3. The improvement claimed in claim 2, wherein said circuit means connects said sealed housings and said pressure detecting means in series.

4. The improvement claimed in claim 2, wherein said circuit means comprises plural parallel circuits connected to respective of said sealed housings, and said pressure detecting means comprises plural pressure detectors, each said pressure detector being connected to and responsive to a respective parallel circuit.

* * * * *